United States Patent Office 3,220,860
Patented Nov. 30, 1965

3,220,860
CERAMIC MATERIALS
Alfred Gordon Evans Robiette, Bovingdon, and Eric Adolph Brandes, Chalfont St. Peter, England; said Brandes assignor to Fulmer Research Institute Limited, Buckinghamshire, England
No Drawing. Filed Aug. 1, 1962, Ser. No. 213,887
Claims priority, application Great Britain, Aug. 2, 1961, 28,100/61; Aug. 22, 1961, 30,303/61
3 Claims. (Cl. 106—44)

This invention relates to ceramic materials.

It is an object of the invention to provide a process for forming granular ceramic materials into rigid masses.

A further object of the invention is to provide rigid refractory materials such as bricks and blocks from granular refractory materials.

Another object is to provide monolithic refractory furnace linings and the like from granular refractory materials.

Yet another object is to provide a novel process for the manufacture of shaped, hard ceramic articles such as grinding wheels.

According to the invention a process of forming a granular ceramic material into a rigid mass comprises mixing the granular ceramic material with aluminum powder and/or magnesium powder and an oxidizing chromium compound, compacting the mixture into a desired shape and heating it to a temperature at which the metal reacts with the chromium compound liberating heat and causing the mixture to consolidate.

The consolidation is believed to be a partial fusion and agglomeration of the ceramic granules. However, the amounts of the exothermically reactive substances employed need not be sufficient to raise the whole bulk of the material up to the sintering temperature since the chromium-containing residues of the thermal reaction may assist in imparting rigidity and strength to the resulting mass by the formation of spinels or other complex structures which have a bonding effect.

The heating to set off the reaction between the metal and the chromium compound is preferably sufficiently intense to melt both the metal and the chromium compound. It is believed that this melting assists rapid reaction to form a strong crystalline bond.

The compacting of the mixture may be performed before or during the heating.

The oxidizing chromium compound may be a chromate such as calcium chromate, a dichromate such as potassium dichromate, or chromic anhydride. For products which are required to be water-resistant, alkali metal dichromates are less suitable than chromic anhydride or calcium chromate.

Proportions of the ingredients are preferably within the following ranges, by weight:

| | Preferred range, percent | Most preferred range, percent |
|---|---|---|
| Ceramic material | 60–97½ | 64–84 |
| Chromium compound | 2–30 | 14–30 |
| Metal powder | ½–10 | 2–6 |

The nature of the ingredients and the particle size distribution of the ceramic material are selected to suit the particular application.

In cases where the mixture is required to be coherent before the reaction, e.g. in the case of portable masses which have to be handled before the reaction, a bonding material may be used such as water, wax, oil, magnesium sulphate solution, sugar or molasses. Preferably the bonding material should not leave after the heating a decomposition residue which would impair the required properties of the product.

The size of the granules of the ceramic material should be so selected that when the mass is compacted it will have a high density with a minimum of voids, e.g. by suitably blending coarse and fine granules.

The granular ceramic materials may be basic or neutral granular refractory materials in which case the resulting rigid masses may be refractory blocks, bricks or other shapes, and even monolithic furnace linings.

The invention may be applied to any basic or neutral materials used as refractories. Calcined magnesite and calcined dolomite are examples of suitable basic materials, and alumina and silicon carbide are examples of suitable neutral materials. Such materials are highly resistant to attack by many metallurgical slags and are highly refractory, their softening points being in the range of 1700 to 2200° C.

When a furnace lining is of the monolithic type and a former is used, a bond may not be required to hold the material together before it is fired. In such a case the act of burning out the former may generate sufficient heat to start the exothermic reaction.

In an induction melting furnace the dry granular mixture can be rammed around a cylindrical metal former which is in the shape of the bath or crucible. It is often advisable to have next to the inductor coil a layer of loose refractory material with no metal powder so that this layer is not electrically conductive, but the inner face next to the former requires to be a hard sintered refractory as this surface will be in contact with the molten metal and slag. The lining mixture made in accordance with the invention is rammed next to the former, and around it is applied a layer of refractory material free from metal powder and chromium compound. The resulting lining will, therefore, be of two layers, a loose unsintered layer on the outside of the lining next to the coil and the hard sintered material forming the cylindrical bath or crucible. The reaction in this case can be started by heating the metal former by the induced current from the coil. The former can be melted and incorporated in the first melt.

Other rigid masses are grinding wheels, for example, in which case abrasives such as silicon carbide base materials, corundum and Alundum are suitable granular ceramic materials.

These may be used in any desired particle size range and distribution. The active mixture may be varied both as to metal and oxidizing agent, but if the wheel is to be used with an aqueous coolant it is necessary to restrict the choice of oxidizing agents to those which give insoluble reduction products, e.g. chromic anhydride or calcium chromate.

Forming pressures and mix compositions may be varied to give products of different porosities and strengths. Some advantages of this method over conventional grinding wheel manufacture are the low temperature and short time required to fire the wheels and the small dimensional change on firing, which is only about 1% expansion.

The following examples illustrate the invention. In the examples, percentages are by weight.

*Example I*

70% coarse burnt magnesite which was retained on a 16 mesh sieve (BSI) was mixed with 11% of fine burnt magnesite which passed through 100 mesh sieve. To this was added 16% potassium dichromate powder and 3% aluminum powder. This mixture was pressed into a block after adding 2% moisture, and the block was placed in a furnace which was maintained at 950° C.

As soon as the surface of the block approached the furnace temperature the exothermic oxidation of the aluminum powder commenced and the temperature of the whole mass rapidly increased to that at which consolidation of the mixture took place, and in a matter of ten minutes the block became a hard solid refractory mass.

The mixing as described could be done in other ways. For instance, the fine magnesite could be mixed with the aluminum powder and the dichromate, and after this had been thoroughly mixed the coarse magnesite could then be added.

*Example II*

A mixture of 76.2% fused magnesium oxide, 20.3% calcium chromate (commercial grade) and 3.5% aluminum powder was dry pressed into a block. The block was heated to 1200° C., whereupon a reaction took place and was completed within a few minutes. The product was a strong refractory body.

*Example III*

A mixture of 70.0% fused alumina (60 mesh, BSI, nominal mesh size), 25.0% chromic anhydride (commercial grade) and 5.0% aluminum powder was dry pressed into a block. The block was heated to 900° C. whereupon a reaction took place and was completed within a few minutes. The product was a strong refractory body.

*Example IV*

A mixture of 70% burnt magnesite (coarse), 11% burnt magnesite (fine), 16% potassium dichromate and 3% aluminum powder was pressed and fired at 950° C. After reaction a Seger cone shape was cut from the product and heated in air to a temperature of more than 1850° C. After this it showed no melting even at the sharp edges. Similar pieces were heated to about 1300° C. and cooled rapidly in a cold air blast. They showed no signs of cracking or failure.

*Example V*

The following mix was pressed into the shape of a grinding wheel in a steel die at ten tons per square inch pressure

|  | Percent |
|---|---|
| 60 mesh alumina | 70 |
| Chromic anhydride | 25 |
| Aluminum powder | 5 |
| Water (addition) | 3 |

The pressed shape was then oven dried and introduced into a furnace at 900° C. Firing was complete after a few minutes, the exact time depending on the size of the wheel being made.

*Example VI*

A mixture of:

|  | Percent |
|---|---|
| Magnesium powder | 1 |
| Potassium dichromate | 4 |
| Magnesia (dead burnt) | 95 | was pressed into a block using a pressure of 10 tons/in.$^2$ and placed for five minutes in a furnace at a temperature of 900° C. Even with this small percentage of magnesium the product was hard, strong and refractory. Dimensionally, there was little change between the pressed bodies before firing and the resulting products. At most there was a slight expansion not exceeding 1%.

What we claim as our invention and desire to secure by Letters Patent is:

1. A process of forming a granular refractory ceramic material into a rigid mass of predetermined shape which comprises mixing said granular refractory material selected from the group consisting of calcined magnesite, calcined dolomite, alumina, silicon carbide, and magnesia with a powdered metal selected from the group consisting of aluminum and magnesium, and an inorganic oxidizing compound selected from the group consisting of calcium chromate, potassium dichromate and chromic anhydride, said refractory material being present in the range of from 60 to 97½% by weight, said powdered metal being present in the range of from ½ to 10% by weight, said inorganic oxidizing compound of chromium being present in the range of from 2 to 30% by weight, compacting said mixture in said predetermined shape and heating said compacted mixture to a temperature at which said metal reacts with said inorganic oxidizing compound of chromium liberating heat and causing said mixture to consolidate into said rigid mass of predetermined shape.

2. A process of forming a granular refractory ceramic material into a rigid mass of predetermined shape which comprises mixing said granular refractory material selected from the group consisting of $MgCO_3$, $CaMg(CO_3)_2$, $Al_2O_3$, SiC, and MgO with a powdered metal selected from the group consisting of aluminum and magnesium, and an inorganic oxidizing compound selected from the group consisting of alkali metal and alkaline earth metal chromates and chromium oxides, said refractory material being present in the range of from 60 to 97½% by weight, said powdered metal being present in the range of from ½ to 10% by weight, said inorganic oxidizing compound of chromium being present in the range of from 2 to 30% by weight, compacting said mixture in said predetermined shape and heating said compacted mixture to a temperature at which said metal reacts with said inorganic oxidizing compound of chromium liberating heat and causing said mixture to consolidate into said rigid mass of predetermined shape.

3. A mixture of a granular refractory material selected from the group consisting of calcined magnesite, calcined dolomite, alumina, silicon carbide, and magnesia; a powdered metal selected from the group consisting of aluminum and magnesium; and an inorganic oxidizing compound selected from the group consisting of calcium chromate, potassium dichromate and chromic anhydride; said refractory material being present in the mixture in the range of from 60 to 97½% by weight, said powdered metal being present in the range of from ½ to 10% by weight and said oxidizing compound of chromium being present in the range from 2 to 30% by weight.

References Cited by the Examiner

UNITED STATES PATENTS

| 2,279,260 | 4/1942 | Benner et al. | 51—309 |
| 2,336,360 | 12/1943 | Kleinschmidt et al. | 106—59 |
| 2,487,290 | 11/1949 | Austin et al. | 106—59 |
| 2,537,013 | 1/1951 | Austin et al. | 106—59 |
| 2,671,732 | 3/1954 | Birch et al. | 106—59 |

ALEXANDER H. BRODMERKEL, *Primary Examiner.*

MORRIS LIEBMAN, *Examiner.*